US008364549B2

(12) United States Patent
Sell

(10) Patent No.: US 8,364,549 B2
(45) Date of Patent: Jan. 29, 2013

(54) METHOD, SYSTEM, AND APPARATUS FOR THE CUSTOMIZATION OF THE FUNERAL HOME SERVICES AND PRODUCTS, FOR HUMANS, ANIMALS, AND PETS

(75) Inventor: Pamela C. Sell, Dublin, OH (US)

(73) Assignee: Pamela C. Sell, Dublin, OH (US)

( * ) Notice: Subject to any disclaimer, the term of this patent is extended or adjusted under 35 U.S.C. 154(b) by 1380 days.

(21) Appl. No.: 11/828,354

(22) Filed: Jul. 26, 2007

(65) Prior Publication Data

US 2009/0030804 A1    Jan. 29, 2009

(51) Int. Cl.
G06Q 30/00    (2006.01)
(52) U.S. Cl. .................... 705/26.1; 705/27.1
(58) Field of Classification Search ............ 705/26, 705/27
See application file for complete search history.

(56) References Cited

U.S. PATENT DOCUMENTS

| | | | |
|---|---|---|---|
| 5,016,330 A | | 5/1991 | Botsch |
| 5,054,290 A | * | 10/1991 | Hogan ............... 62/45.1 |
| 5,875,528 A | | 3/1999 | Parker |
| 6,055,793 A | | 5/2000 | Irwin et al. |
| 6,175,995 B1 | | 1/2001 | Parker et al. |
| 6,520,606 B1 | | 2/2003 | Robinson |
| 6,571,439 B1 | | 6/2003 | Sens |
| 6,584,658 B2 | | 7/2003 | Robinson |
| 6,785,938 B1 | | 9/2004 | Johansen |
| 6,785,939 B1 | | 9/2004 | James |
| 6,854,165 B1 | | 2/2005 | Parker |
| 7,082,653 B1 | | 8/2006 | Sueppel |
| 7,096,546 B2 | | 8/2006 | Poirier |
| 2002/0046046 A1 | * | 4/2002 | Barrott et al. .............. 705/1 |
| 2002/0100195 A1 | | 8/2002 | Hsu |
| 2003/0004740 A1 | | 1/2003 | Dickey et al. |
| 2003/0120472 A1 | * | 6/2003 | Lind .......................... 703/13 |
| 2004/0073450 A1 | | 4/2004 | Bastianelli et al. |
| 2004/0158959 A1 | | 8/2004 | Bell et al. |
| 2005/0061823 A1 | | 3/2005 | Lu |

OTHER PUBLICATIONS

Paw2Heaven: Paws2Heaven web site; Internet Archive Wayback Machine; www.archive.org; www.paws2heaven.com; Jul. 16, 2006, 7pgs.*
ILovedMyPet: ILovedMyPet web site; Internet Archive Wayback Machine; www.archive.org; www.ilovedmypet.com; Jul. 4, 2006, 10pgs.*
Cherished Pets: Cherished Pets web site; Internet Archive Wayback Machine; www.archive.org; www.cherishedpets.com; Sep. 8, 2006, 2pgs.*

* cited by examiner

Primary Examiner — Robert M. Pond

(57) ABSTRACT

This relates to the products and services for funeral homes (for pets, animals, and humans), general memorabilia, general awards, pet awards, human awards, and general gifts, along with the customization of those items (for humans and pets). The customization can be done with the computer or through an interface with the Internet, such as a dedicated web site. It relates to items such as football theme dog, cat musical globe, graduation awards, hand-made objects, small gifts, urn, music box, jewelry box, personalized item, or prize. It relates to the software and business method that makes the customization on the Internet or any other computer or telecommunication network. It relates to the shape and accessories for urn, engravings, material choices, and urn structure. It relates to the box for ashes for animals or people, with different shelves, trays, doors, caps, hinges, and containers, with various functions, and with various figurines and plates, as described here, as some of the optional features.

20 Claims, 55 Drawing Sheets

HIERARCHICAL CHOICES
& OPTIONS / TREE
STRUCTURE

Dog and cat cremation urn

Figurines For Urns

Guardian Angel Light

Engraved Plate Options, Handcrafted Wooden Urns.

Angel Pins

Black Wall Pet urns.

Brass Scattering Pet Urns.

Brown Resin Urn.

Canterberry Urn

Classic Clay Urn

Gold Claw Foot Urn.

Gold Orient Urn

Gold Picture Photo Box Urn.

Gold Scroll Memory Box (made from a polyresin with a gold antique copper finish)

Long Oak Urn

Home >> Conventional Pet Urns

Memory Box Gold w/ red jewel

Memory Box, Pink Heart

Orange Gold Urn

Paisley Urn with Picture Frame.

Temple Memorial Pet Urn

Walnut Photo Box Urn

White Urn.

Boxer Pups In A Basket

Home >> Candles >> Forever Friends Dog Candle

Dog Picture Frames

Home >> Pet Memorial Products >>
Dog Memorial Products >>
Dog Angels And Devils >> Dog Angels Black/White Cat Urn.

Dog musical globes

ROTATED CAP OR LID

HIERARCHICAL CHOICES
& OPTIONS / TREE
STRUCTURE

METHOD, SYSTEM, AND APPARATUS FOR THE CUSTOMIZATION OF THE FUNERAL HOME SERVICES AND PRODUCTS, FOR HUMANS, ANIMALS, AND PETS

BACKGROUND

This invention relates to the products and services for funeral homes (for pets and humans), general memorabilia, general awards, and general gifts, along with the customization of those items (for humans and pets). The customization can be done with the computer or through an interface with the Internet, such as a dedicated web site.

Some of the prior art are listed here:

Carol Fields, US Application 20040010436, teaches a method and apparatus for providing an avenue for terminal service organizations to enlist customers for a web-service. What is needed are avenues for terminal service organizations to enlist customers for web-services, which can provide web service products of a quality and timeliness worthy of the memory of those who pass from this life. The community members need to be able to access such web-service products, while protecting the financial security and privacy of the community.

Bell, Jan, et al., United States Patent Application 20040158959, teaches a casket corner piece display pedestal and associated methods for memorializing a deceased individual. The casket corner piece display pedestal has a center piece having first and second ends, with a casket corner piece receiving surface disposed therebetween.

Bastianelli, Ann, et al., United States Patent Application 20040073450, teaches a method of assisting a loved one of a deceased in planning a funeral or other service which memorializes the deceased.

Dickey, Bradley Jade, et al., United States Patent Application 20030004740, teaches a method of providing pet care products, services and information, which comprises receiving pet care products, services and information from a supplier, and, as a preferred provider, dispensing the pet care products, services and information to pet owners.

Lu, Lay, United States Patent Application 20050061823, teaches a sealing plug for a liquid-filled container having a lower opening therein, with an extended skirt thereon. The plug comprises a peripheral cylindrical wall, for sealing and engaging the skirt of the container.

Hsu, Shun-His, United States Patent Application 20020100195, teaches a water globe arrangement, including a fluid pump immersed in a fluid within the fluid-containing glass dome (the fluid pump drawing fluid in through a fluid inlet, and expelling the fluid through a fluid outlet, thereby circulating the fluid, and creating a visual movement effect within the glass dome).

Johansen, Jr., U.S. Pat. No. 6,785,938, teaches a pet crematory urn for storing the cremated remains of a deceased pet, where a decorative figure in the nearly exact likeness of the deceased pet provides a sealable repository chamber for receiving cremated remains of a deceased pet.

Parker, U.S. Pat. No. 5,875,528, teaches a cremation urn, comprising a first mass and a second mass, contained within the first mass. The second mass includes an opening communicating with a cavity within the second mass for receiving cremated remains.

Poirier, U.S. Pat. No. 7,096,546, teaches a multi-compartment funeral urn has an ash compartment and at least one alternate compartment, which can be used for putting in accessories, such as a book binder that can include a signature registry, a photo album, or any such items.

Sueppel, U.S. Pat. No. 7,082,653, teaches a picture frame and container for cremation ashes.

James, U.S. Pat. No. 6,785,939, teaches a decorative urn for use as a lighted memorial.

Parker, U.S. Pat. No. 6,854,165, teaches a combination lawn/garden ornament and cremation container.

Johansen, Jr., U.S. Pat. No. 6,785,938, teaches a pet crematory urn.

Ogle, II, U.S. Pat. No. 6,775,886, teaches an urn for ashes.

Robinson, U.S. Pat. No. 6,584,658, teaches an urn assembly.

In addition, the following teach variations on urn, cremation remains container, related process, or personalized pet animal memorial product:

Sens, U.S. Pat. No. 6,571,439,
Robinson, U.S. Pat. No. 6,520,606,
Parker, U.S. Pat. No. D444,933,
Parker, et al., U.S. Pat. No. 6,175,995,
Parker, et al., U.S. Pat. No. D424,275,
Irwin, et al., U.S. Pat. No. 6,055,793,
Luebke, U.S. Pat. No. 6,023,822,
Bach Lahor, U.S. Pat. No. 5,950,288,
Diviak, Sr., U.S. Pat. No. D398,733,
Zukowski, et al., U.S. Pat. No. 5,230,127,
Botsch, U.S. Pat. No. 5,016,330,
Gardner, U.S. Pat. No. 4,781,174,
U.S. Pat. No. 6,735,831,
Application 2002/0082855A1,
U.S. Pat. No. 5,611,124, and
U.S. Pat. No. 4,324,026.

However, none of the above teaches the inventions in the current application, as described below.

SUMMARY

The inventions here relate to the products and services for funeral homes (for pets, animals, and humans), general memorabilia, general awards, pet awards, human awards, and general gifts, along with the customization of those items (for humans and pets). The customization can be done with the computer or through an interface with the Internet, such as a dedicated web site or server.

It relates to items such as football theme dog, sport theme globes containing figurines or music, cat musical globe, graduation awards, hand-made objects, small gifts, urn, music box, jewelry box, key chains, desk sets, personalized item, or prize.

It relates to the software and business method that makes the customization, on the Internet or any other computer or telecommunication network.

It relates to the shape and accessories for urn, engravings, material choices, and urn structure. (e.g. different medium used for accessories, such as picture/text engraved on marble or tile.)

It relates to the box for ashes for animals or people, with different shelves, trays, doors, caps, hinges, and containers, with various functions, and with various figurines and plates, as described below, as some optional features.

The system to customize the products relates to:
providing an avenue for terminal service organizations to enlist customers for a web-service automatic generation of database and mechanism for external web services
server-side wireless development tool
system, method, and medium for component based web user interface frameworks
printing system for generating personalized memorial items, and methods for generating such items
computerized family advising system and making funeral arrangements
urn/casket
lightweight viewing casket
cremation urn
personalized casket ornament display plaque
memorial urn
ash silhouette display device

BRIEF DESCRIPTION OF FIGURES

FIGS. 1-44. Embodiments/examples for frames, boxes, urns, figurines, options, materials, sizes, shapes, functions, and structures, as selected from the web site, under different pages, menus, and classifications/breeds/species.

DETAILED DESCRIPTION OF THE PREFERRED EMBODIMENTS

Figure 1:
Figure 2:
Figure 3:
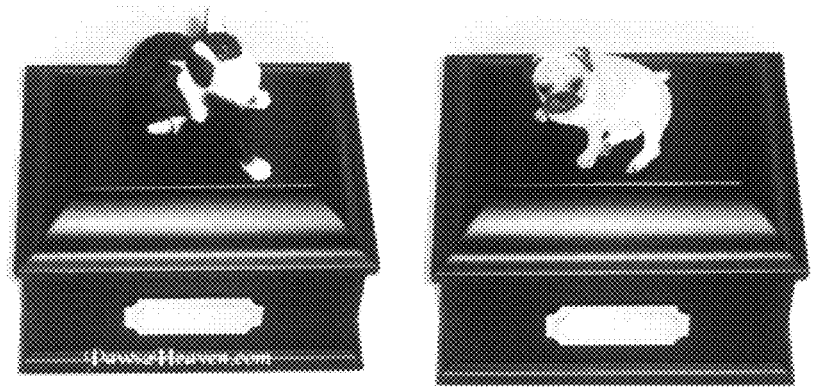
Figure 4:
Figure 5:
Figure 6:
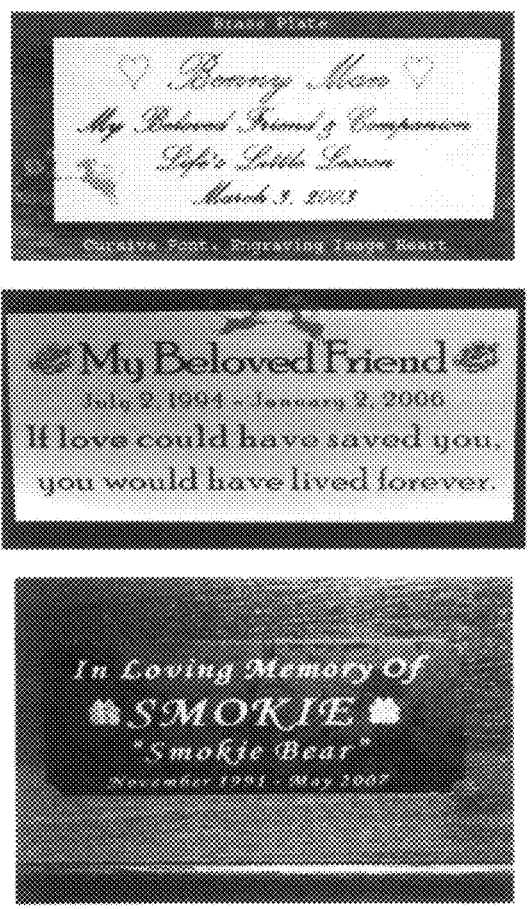
Figure 7:
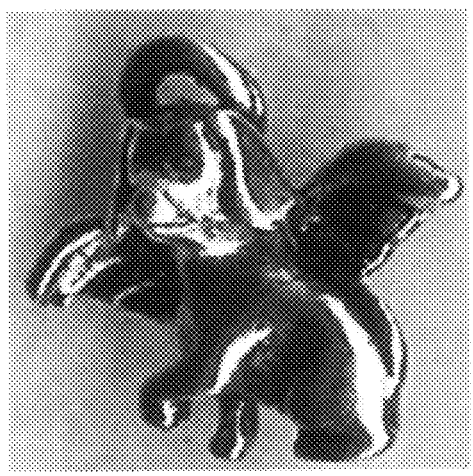
Figure 8:
Figure 9:
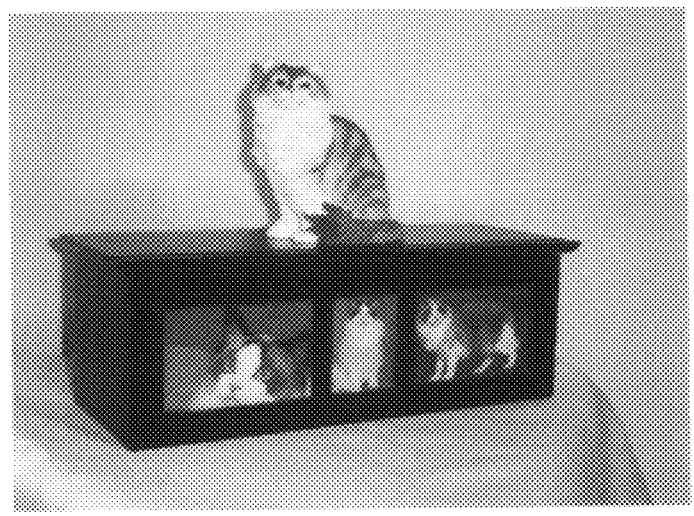
Figure 10:
Figure 11:
Figure 12:
Figure 13:
Figure 14:
Figure 15:
Figure 16:
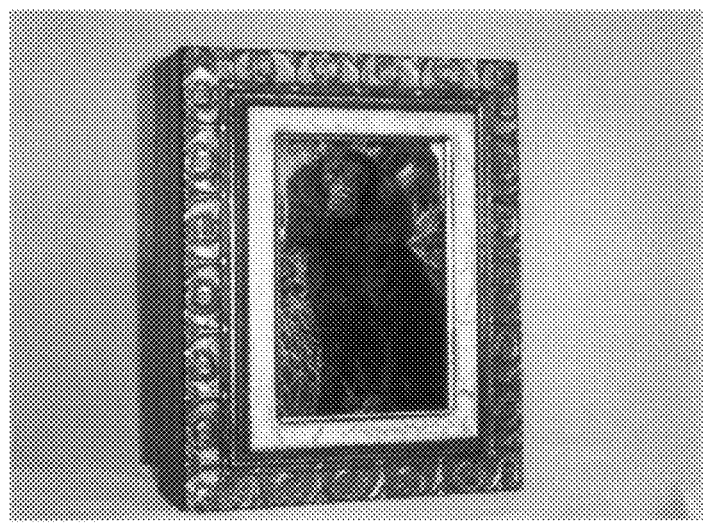
Figure 17:
Figure 18:
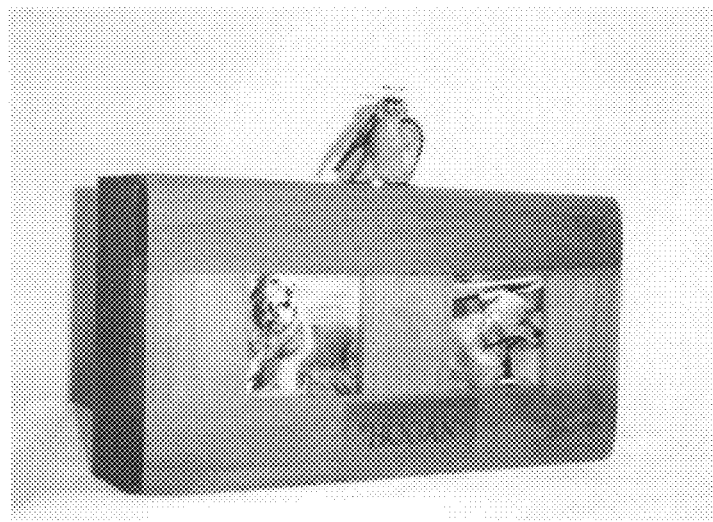
Figure 19:
Figure 20:
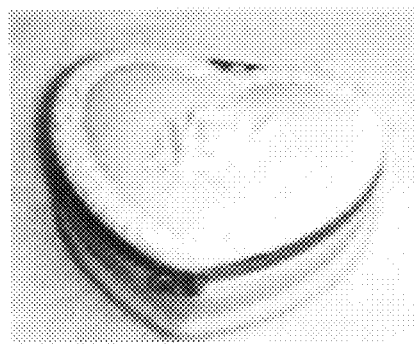
Figure 21:
Figure 22:
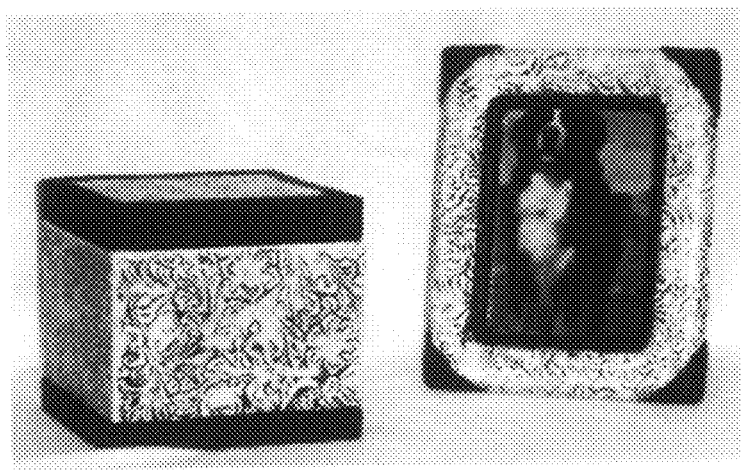
Figure 23:
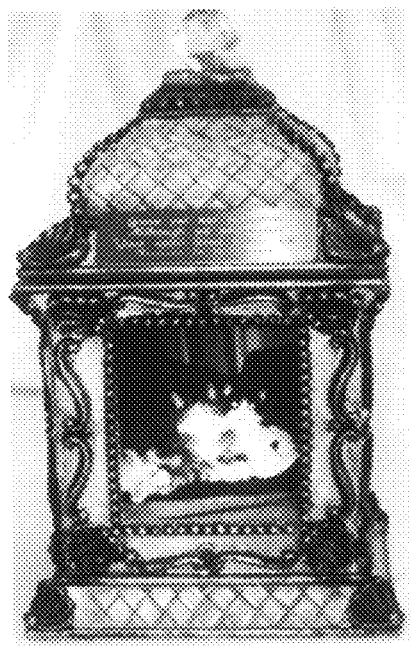
Figure 24:
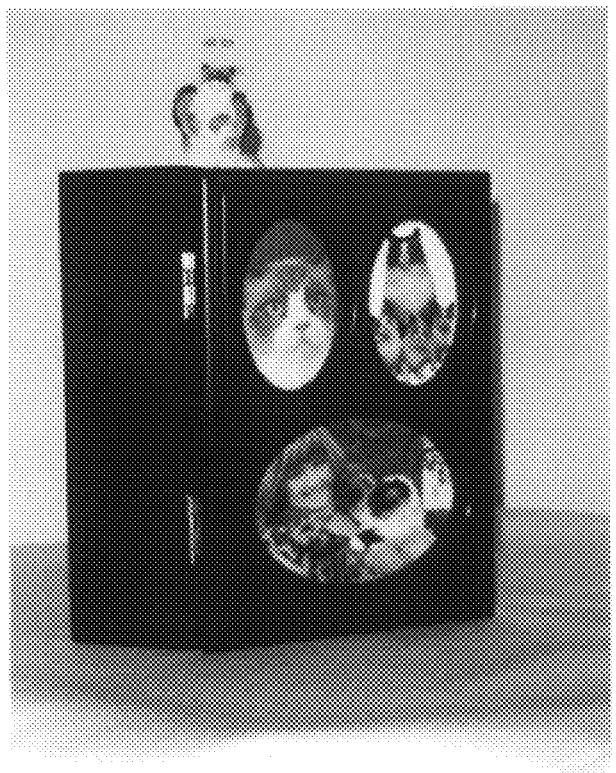
Figure 25:
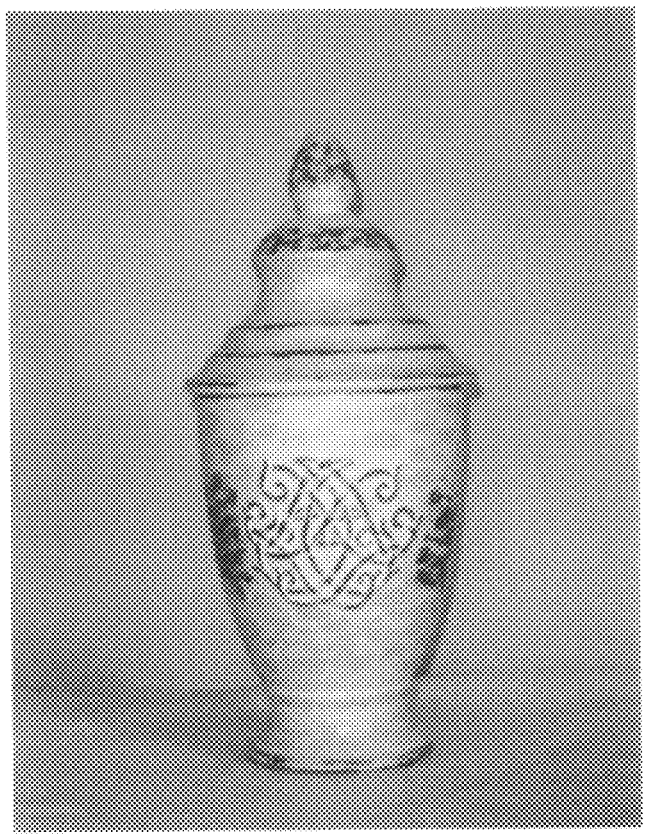
Figure 26:
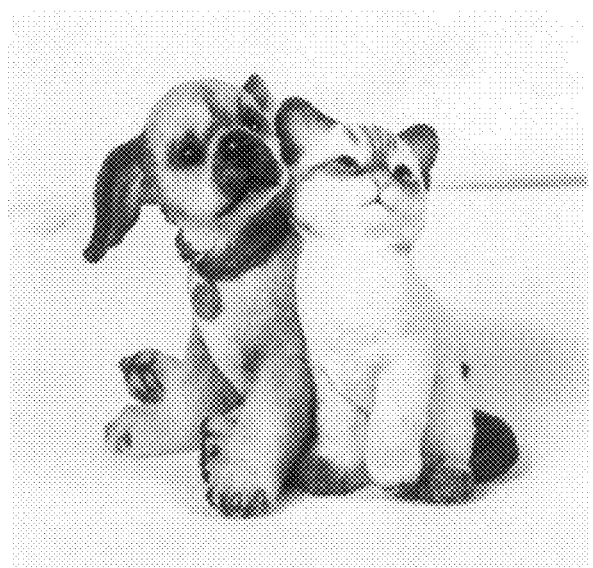
Figure 27:
Figure 28:
Figure 29:

The choices below are different embodiments and examples, and can be used alone or in combination with each other:

The customization web site (method, system, or apparatus) gives the user the choices on: urn, globe, casket, laser engraving, material, such as marble, wood, and acrylic, cremation box, and build-it-yourself capability from scratch, using components that are interchangeable or can be put together as blocks, and observe the simulated end result on the screen of the computer, before actual making or ordering the object, to verify and get the acceptance of the consumer for the specific object or order.

The choices for figurines, dolls, toys, objects, handle-shapes, engraving, or print figures are the animals (as an example), such as dog or cat, the kind and sub-species/sub-divisions/categories/breeds of the animals, such as Bulldog, Afghan, or Persian Cat, the color or paintings, the shape, the size, such as extra-large, or the position, such as a sitting dog.

The cards (e.g. personalized material cards, e.g. poems, pet loss cards, or personalized information) can also be sent to a specific address, using an e-mail or regular mail (for a fee, for this service). The cards can also be customized for different occasions and purposes. Some templates already exist on the web site, or the user can make it herself/himself. Alternatively, for a fee, the web site designers can do the design for the user, and submit the file to him/her for his/her approval. It can be integrated to a regular e-mail or other customized private e-mails, for all contact lists and e-mail management and tracking (or reminding notices). The digital picture/video/cartoon sequence/animation of the pet or people (or any object) can be added to the e-card, as well.

User can refer to funeral homes or pet loss providers, such as veterinary supplies, clinics (or human divisions), pet loss group supervisors, pet stores, humane societies, or any other entity that may provide or have an interest in providing support to grieving pet owners or human survivors. Computer/web/software medium will be utilized by the end users, and interface provides customization of memorial products, gifts, and etc. In addition to incorporating product database into existing systems, currently used by such service providers (e.g. veterinarian clinic which has existing website), the database containing products/method for customization can be interfaced/added to the current web site, providing marketable web development tool that appeals to the end-user, utilizing decreased fees that would have been incurred, if clinic had to pay a web developer to add products or functionality from scratch.

The frames/medium for pictures can be customized and put on the box. The engraving method, size, text, font, language, material, etching method and agent, removed material, added material, ink, deposition method and material, color, reflectivity, bar code, magnetic ink, ingredients, chemical compounds used, plate, plate location, plate size, plate material, plate shape, box material, box for toys or jewelry, container material, urn material, angle, contrast, hue, shape, message, laser type for engraving, stone used for engraving, type of wood (such as treated wood, stained, or oak), type of stone (e.g. granite, marble, sandblasted, polished, or reinforced man-made stone or concrete), plastic, door, cap, box, urn, water globe, "snow-flake" globe, "stadium" globe, "sports theme" globe, globe with gas or air in it, shape of globe (e.g. football helmet shape, and customized for a favorite team, with its logo/colors), translucent material, transparent material, mirror type, polished material, rough surface material, artificial material, bag used, drawer used, cabinet used, shelf used, tray used, or photo frame used, are all customized.

The user can type the text for her message, and the text appears real-time on the computer screen, in the right configuration and spot, such as engraving of the text and image on a plate or on the box, to show the user how everything looks like at the end, for better user's experience (and her confirmation of the purchase and order). The fee is usually based on the number of characters or amount of engraving, and thus, can be shown real-time, as the user types in the message, to be engraved, printed, or shown later, on the object(s).

The user can save files, both incomplete and completed ones, on the web site, for future use or reference. There is an editor for text, figures, video, and multimedia content. The user can download or upload the files.

For boxes or containers, one may have a cap, lid, cover, or door. Tray can be slid in and sealed. Casket can be opened from any directions, such as from bottom. The cap can have a hinge. It can also have lock, combination mechanical password or code, digital password, biometrics verifier, digital license/DRM/digital rights management, certificate, token, smart card, key, or magnetic card, to restrict or verify the access. The inside plate or shelf can lift up or pop up, whenever the door or cap is opened, manually by the user, or automatically.

The globe can sit on a box (or it contains remains), including the ashes, with the engraving and plate on front or top. Different shapes, such as football, stadium, spiral staircase, or sport objects (or for favorite sport or team), can be incorporated to the box, or attached to it (or on top of it).

In one embodiment, the cap for the box (that contains ashes or memorabilia) has a hinge, connected to the box, and cap opens from the top of the box or front of the box, from a single side (opposite of the hinge side). In one embodiment, one has multiple caps with different mechanisms.

In one embodiment, the cap is connected by a few (e.g. 4) rods or springs to the box, from the top or side, so that pushing the cap toward the box, along with a latch or hook, will close the cap on the box (the close-position). Also, in the release/open-situation, the spring(s) push the cap away from the box (sliding on a rod(s) or rail(s), moving parallel (or in an angle) with respect to the frame, or sides/top/bottom, of the box), making the box open, and its content visible to the user.

In one embodiment, the box has a cap with a cover that covers the opening of the box in the closed position, and the cap is connected to the box on a single rod, in which the cap can rotate around the rod, in the same plane as the cap, or in an angle to that plane, causing the cap to move away from the box, and open the box. In one embodiment, this looks like a full-moon to half-moon transition, for the coverage of the opening of the box with a circular cross-section/opening.

In one embodiment, one has multiple caps overlapping and covering the opening, each with its own hinge or rod(s). In one embodiment, one uses the magnet or electromagnet, to close the cap. In one embodiment, the box is cylindrical, cubical, or spherical.

In one embodiment, the cap has sliding sub-parts that go on top of each other, to extend or contract the coverage of the opening of the box, for the close or open positions for the box (or a half-open/close position).

The box/container can have a drawer or tray, or drawers, from different sides, such as bottom. A piece of stone, e.g. marble, can be inside the box, hidden from outside view, with the text on it, plus the other items (e.g. pictures) placed in the box, around or on top of the marble. The tray can be pulled out or swung out, from any direction, or location, on the box. The box can be opened from various directions and sides, such as top or bottom.

A lip can catch the edge of the tray. The tray can have different compartments. The drawer can be permanently sealed, e.g. by glue, lock, Velcro, rope, chain, latch, or screw. The drawer can hold the ashes, and it is hidden from the sight. The combination of size, shape, and the structure/component of the urn (shown here in this invention) is unique.

The graveyard marker can have compartments, and contains various items, with hinges, to open the container.

The web site can be used to customize all aspects of the product, such as cremation container, size, and space to place gifts, prizes, awards, or memorabilia. It can be used for human or pet funeral homes. Urn, globe, or casket can be engraved by laser, on marble, wood, acrylic, or etc. The painting module can customize the appearance, as well as the plate placement, photo frame, mailing card, size, shape, color, font, message, text (as shown on the monitor, in real-time, as the user types the text), or image. The whole package can be viewed as a simulation, before actual purchase, to increase the customer satisfaction and better accuracy (fewer returns of merchandise).

In one embodiment, the box is opened from the bottom. In one embodiment, the box is opened from the top. In one embodiment, the lid has a glass and/or a magnifier to see the contents inside. The lens, fiber optic, or mirror can be used. An email or a regular post card can accompany this system, as a notification, according to the information supplied, to send different messages. Text and images can be customized. The lid can have a light, with a battery, or connected to a regular wall plug. The box can be used in cemeteries. The hollow cap or lid can have a hidden compartment, inside, as well.

In one embodiment, the remains storage area can be divided into separate multiple compartments by a shelf, tray, or other dividers, to allow for separation of several remains.

In one embodiment, the remains storage compartment can be accessed by sliding bottom tray. Tray can contain screen to allow for scattering of ashes. Multiple compartments allow for partial scattering and/or preservation of cremation ashes, providing a dignified vessel for the scattering.

In one embodiment, the remains storage can be accessed from the front, back, or side of the urn, by an opening or by a lid. One example is to open from the front, to make it easy to place remains into urn, without turning the urn over, to insert remains from the bottom. (Traditionally, cremation urns are accessed though the bottom, for placement of remains, usually fixed with screws, and if accessories, such as figurines, marble engravings, and etc., are on the urn, this can be a difficult task for the consumer, who may damage the accessories in this process.

In one embodiment, the urn is a cube/square shape, containing two pieces attached by a hinge, magnet, and etc. Remains storage area can be accessed from the side, by a sliding door. After placement of remains, the urn can be turned on its side to display two viewing areas, where pictures or memory items can be placed. Urn looks like two picture frames, when turned on the side, allowing individuals who are uncomfortable with displaying traditional cremation urns the ability to place the urn in a visible location of their home.

In one embodiment, the cremation urn contains a memorial compartment on top of the urn, which is sealed by magnet or other means, and the urn is accessed traditionally (from the bottom, attached with screws). The compartment contains a lid that conceals memory items, so that customers who want traditionally sealed urns for personal or faith reasons can still have a viewable memory compartment, completely sealed off from the remains.

Urn tray can be accessorized with personalization items, e.g. marble engraved pictures. Referring to closing/sealing of the urn, bottom and top of the urn (lid) can be permanently sealed/secured with dials, e.g. male-female parts (bottom can be routed out, and top has an extended piece that fits into it).

Urn presentation can be with a velvet bag. The box can have a Grave Marker Memorial Compartment.

The box can have a glass/mirror side or cap. The box can have a thermocouple, cooling liquid/pipes, A/C unit, and/or a temperature control unit attached to it (or within itself).

Other options are: Pet Memory Bracelets, pet urns and pet memorial items, memorial candles, angel or animal figurines, dog devils, cat and dog angel pins, kitten and puppy figurines, personalized music for humans or pets, pet cremation urns, Dog Candle Toppers, painting of the figurines, prayer, resemble figurine, animal or human figurines in different occupations, Forever Friends Candles, traditional wood pet urn, oak, walnut, maple, premium hardwood, Parlor Memorial Memory Glitter Globe, music selection/playing/recorded, with music selection on the box, shadow boxes, pet loss card, Rainbow Bridge card, Parlor Rainbow Bridge Memorial Shadow Box, angel dog breed picture, gold, silver, marbleized green, marbleized burgundy, or the water in the globe or display (optionally, containing antifreeze or other similar materials, to prevent the water from freezing, during shipment or display, in the winter months). Note that urn and globe are some of the main features of the current invention.

The choices are done by menu, e.g. from a database, by icons, by small pictures, by code, by classifications, by category, or by typing the description, e.g. by a search engine. In one embodiment, the steps are: choose options, customize options, preview options, see the whole package, modify or confirm the choices, upload images, enter in the shopping cart, do/finish the transaction/payment.

Engraved medium is assembled in real time, with different format, layout, borders, text, and image (uploaded), until the desired result is obtained.

Figure 30:
Figure 31:
Figure 32:
Figure 33:
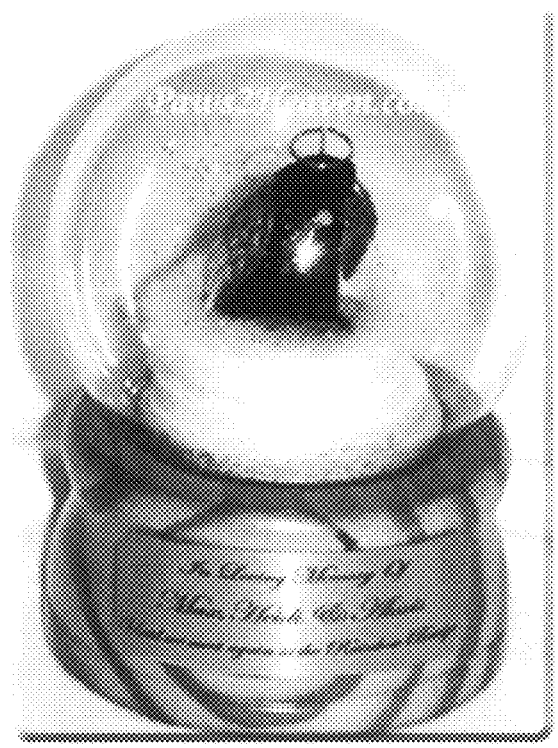
Figure 34:
Figure 3S:
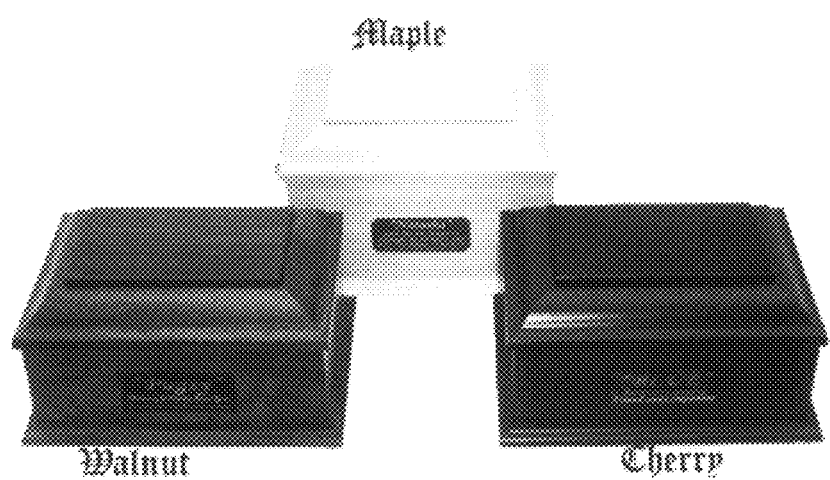
Figure 36:
Figure 37:
Figure 38:
Figure 39:
Figure 40:
Figure 41:
Figure 42:
Figure 43:
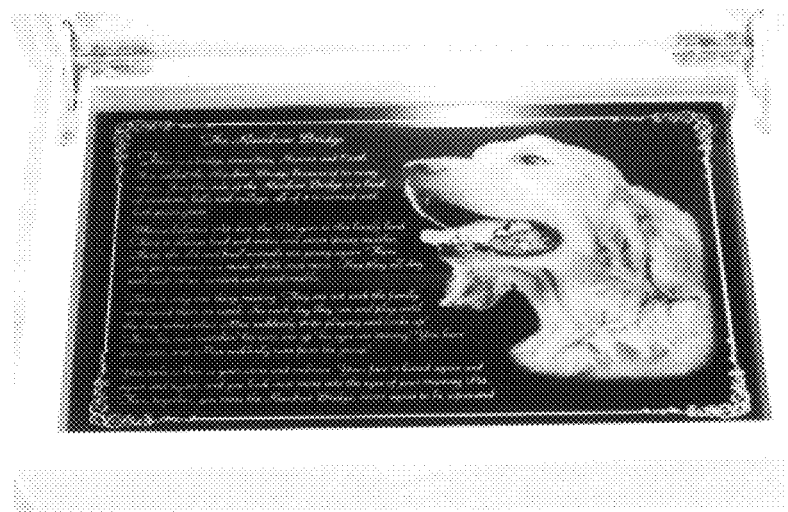
Figure 44:
Figure 45:
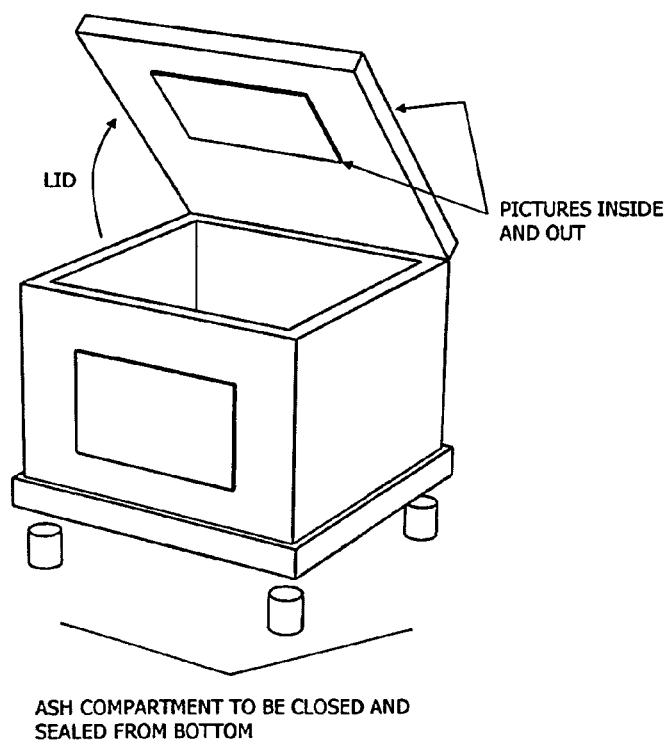
FIG. 45 shows a container with a sealed ash container and picture frames.
Figure 46:
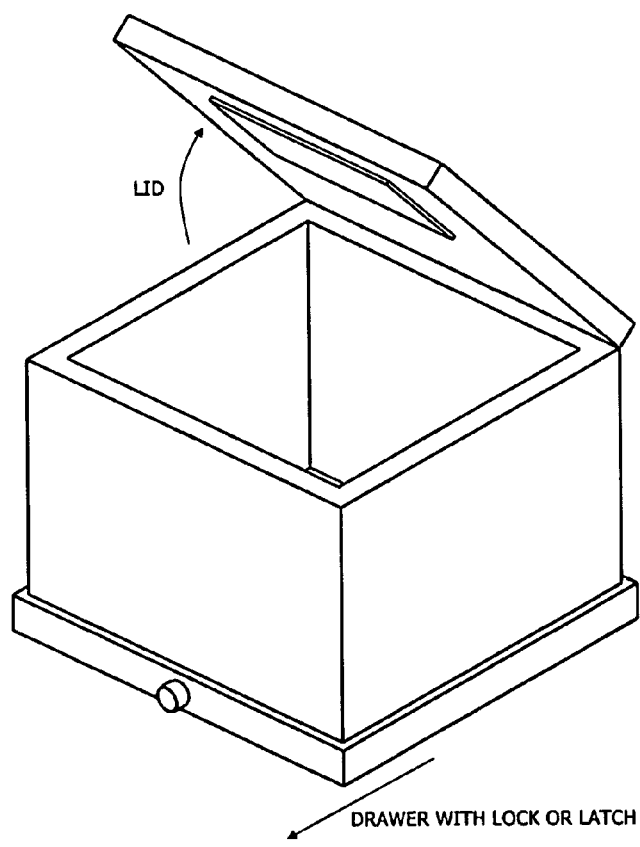
FIG. 46 shows a drawer at the bottom.
Figure 47:
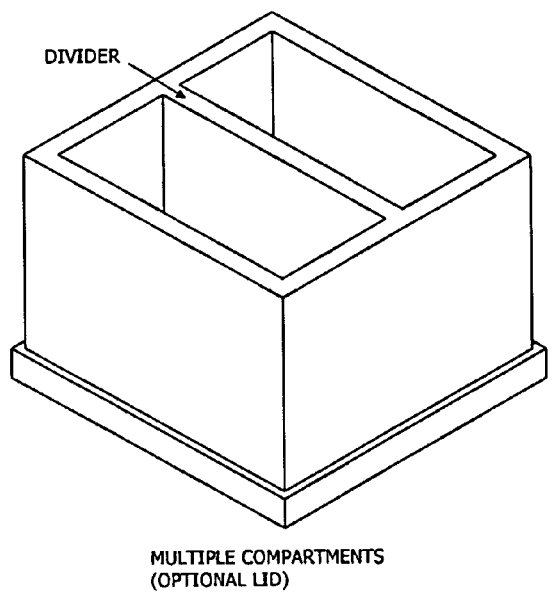
FIG. 47 shows a divider.
Figure 48:
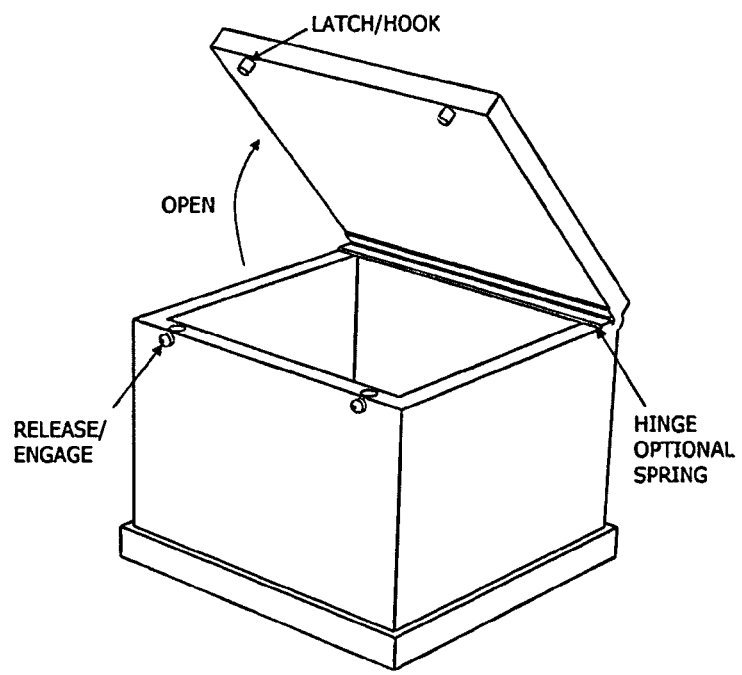
FIG. 48 shows a hinge and a spring.
Figure 49:
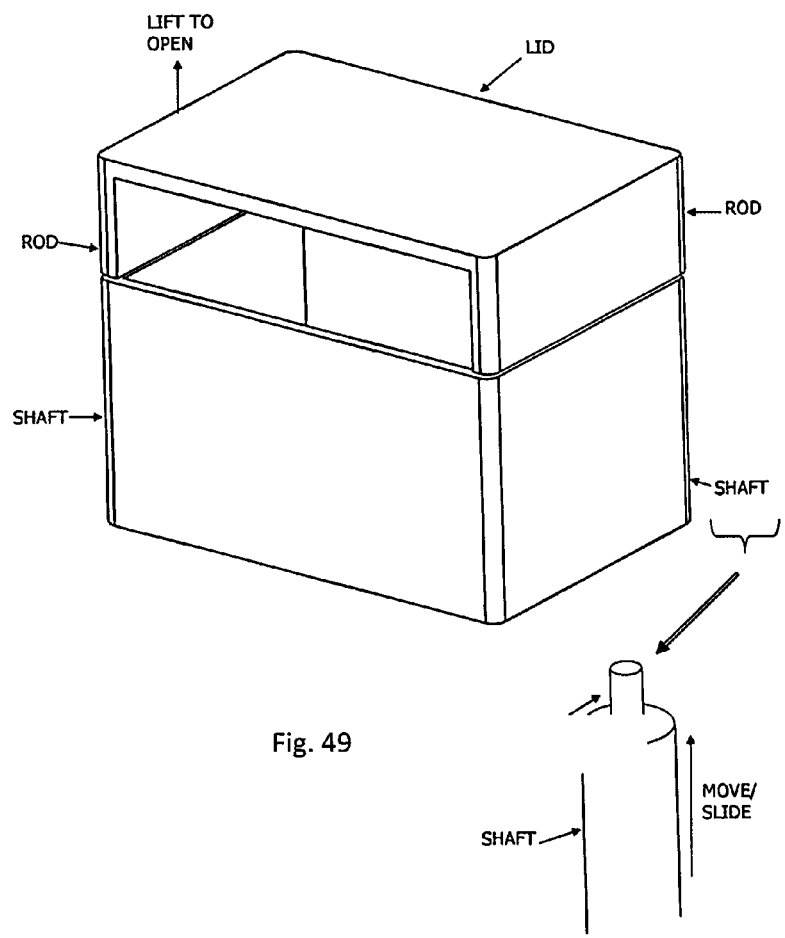
FIG. 49 shows a vertical lift for the lid, with 4 rods on the corners, in 4 shafts.
Figure 50:
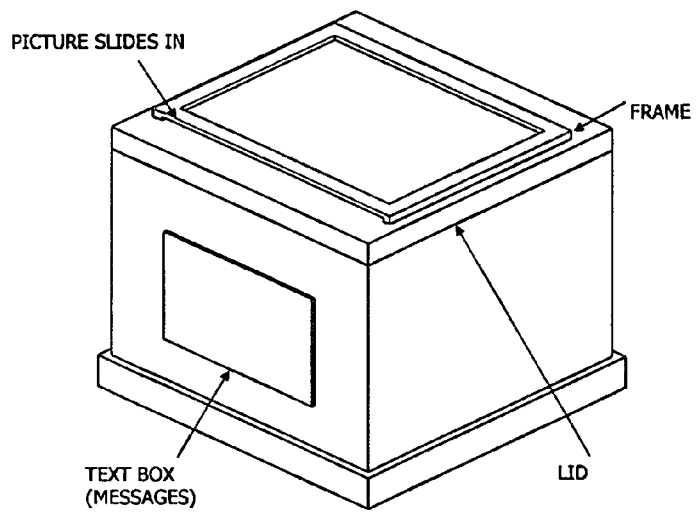
FIG. 50 shows text box and frames.
Figure 51:
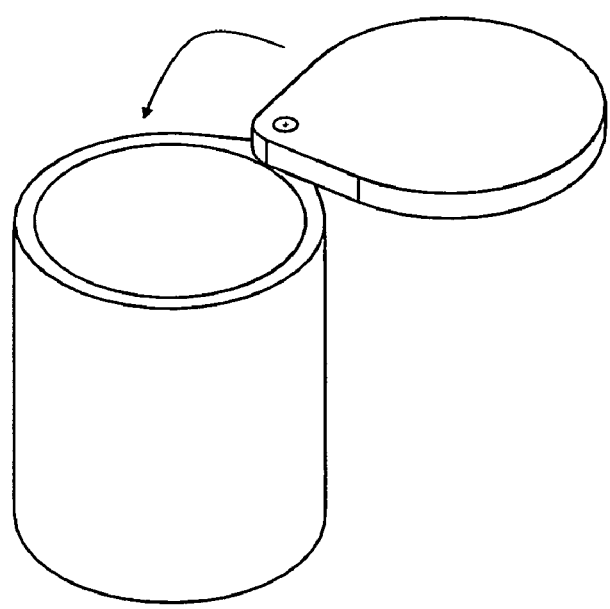
FIG. 51 shows a rotated cap or lid, horizontally, on the top.
Figure 52:
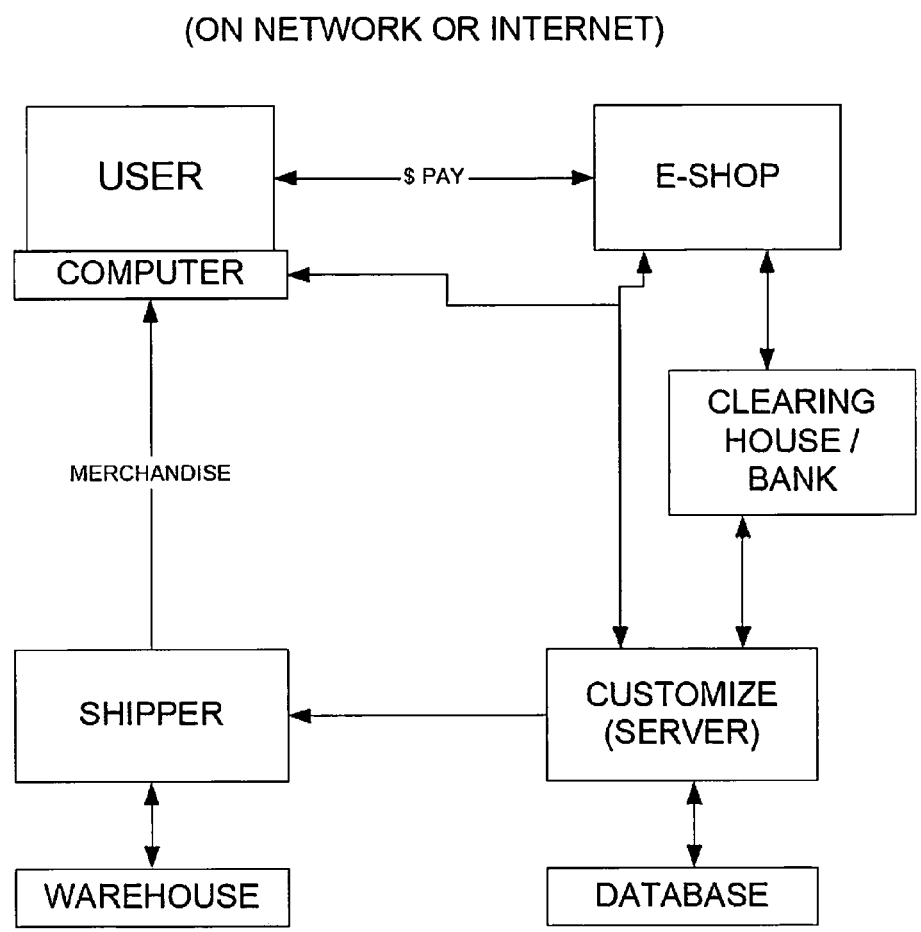
FIG. 52 shows a typical user interacting with our web site to customize the product.
Figure 53:
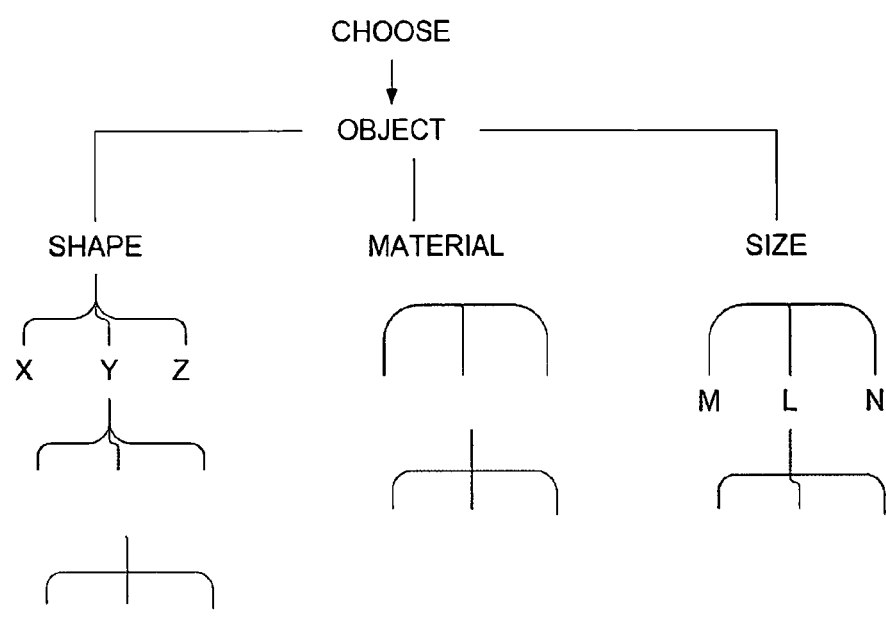
FIG. 53 shows tree structure for choices.
Figure 54:
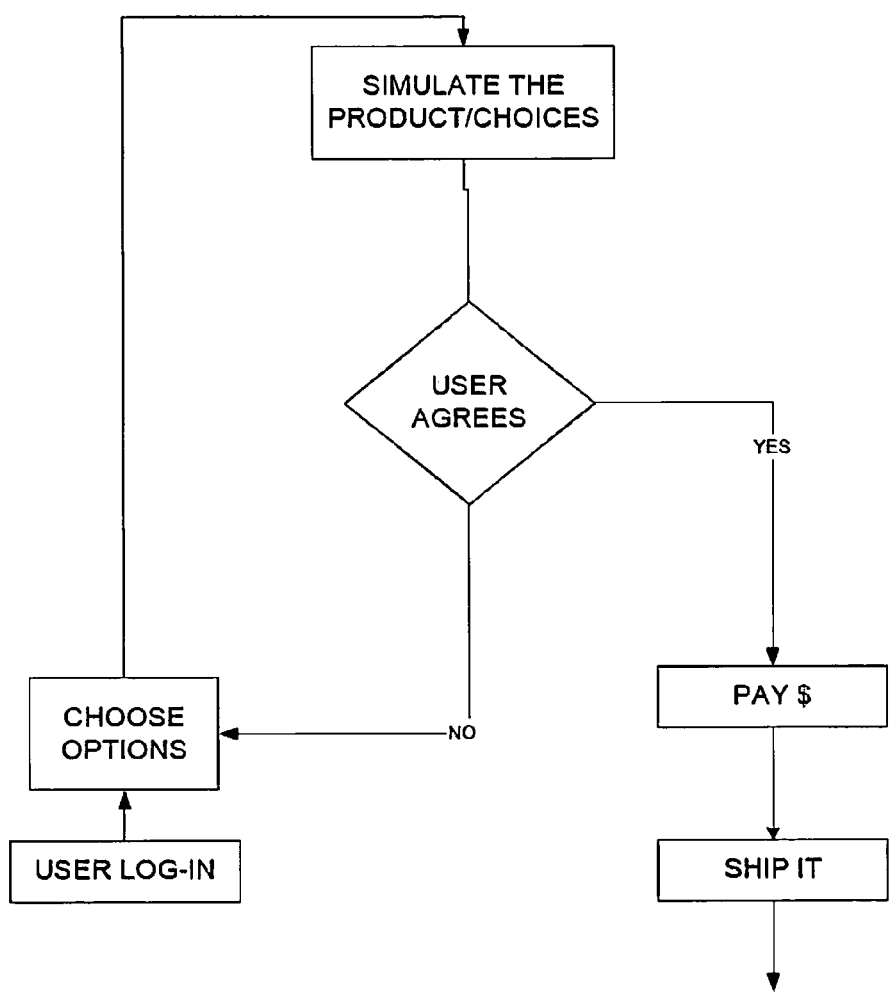
FIG. 54 shows a typical flow chart for decisions.
Figure 55:
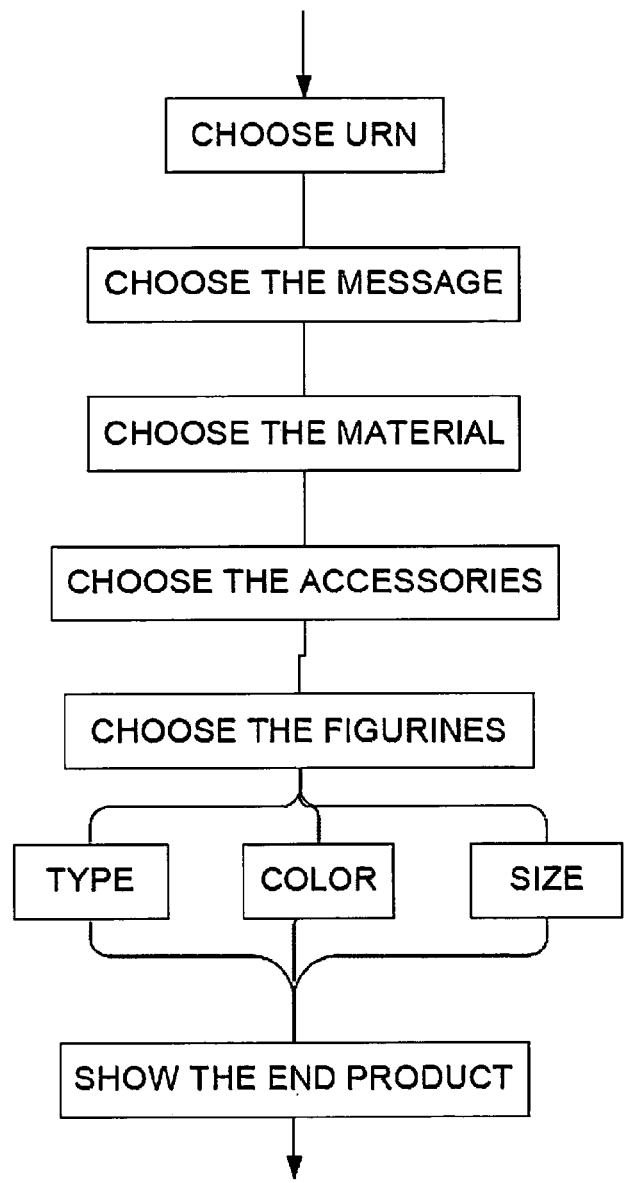
FIG. 55 shows a typical flow chart for choices.

FIGS. 1-44 show some of the embodiments/examples for frames, boxes, urns, figurines, options, materials, sizes, shapes, functions, and structures, as selected from the web site under different pages, menus, and classifications. As can be seen, in FIG. 30, for example, the selection of "Dog Angels" is hierarchical, based on its classification of choices and options. One example is: "Home>>Pet Memorial Products>>Dog Memorial Products>>Dog Angels and Devils>>Dog Angels". That is, the user has to select one sub-option within an option, until the user finds/specify the object completely, with all small features and options determined/specified/chosen by the user/consumer/customer. In general, any method of option selection can be applied in this web site, to guide the consumer to her goal/ultimate customized product/object.

FIGS. 45-51 show some variations of the urn or container. FIGS. 52-55 show typical user interface with our web site, and various choices for the user.

One example is when the user's computer is connected to a server, and the user either downloads, or goes to the server and makes the choices. The choices are as follows (as one example): First, the user chooses the figurine (a cat), then a Persian Cat. Then, the user selects an urn, then the color, shape, material, and accessories, such as lock, hinge, and shelf. Then, the user selects the plate, the message (typed in real-time, and verified by the user), and its position, color, shape, and background. Then, the computer simulates the final product, for the user to inspect and confirm. Then, the user completes the transaction by the proper payment. Using the editor program, the user can further customize the positions and arrangements. Also, the user can input and incorporate the picture of the pet in the frame, or engraved, using a digital image file. At the end, the text, image, components, urn, and accessories (including shape, color, expression, or message) would be unique, and substantially under control/based on the design of the user. Thus, this makes this web site very unique and useful for services and products related to memorabilia, awards, or funeral homes.

In one embodiment, one uses relational databases. In one embodiment, one uses the marketing/profile data from/past history/purchase pattern or preference of a customer, to suggest an option, or show an ad for some related products. This would increase the sales volume.

Any other teaching which is variation of the above teaching is also meant to be covered by the current application.

The invention claimed is:

1. A computer-implemented method for customizing memorial products, said method comprising:
   a) displaying to a user by said computer, selection choices from a group comprising: customizable occasion cards, customizable memorial products and standard products;
   b) in response to receiving a selection choice from the user, determining by the computer customizable memorial products for display to the user, said determining based upon options comprising:
      providing access to a search engine;
      presenting a menu of products;
      using the user's past purchase history profile;
      making a suggestion; and
      presenting an advertisement for related products;
   c) receiving a customizable memorial product selection from the user and type of services;
   d) receiving the user's selection of a customizing option associated with the selected customizable memorial product, wherein said customizing option attributes comprise at least one of: text, video, multimedia content, images, shape, color, material and size;
   e) displaying to the user a real-time simulation of the customizing option applied to the customizable memorial product;
   f) receiving confirmation from the user the customized memorial product is complete else repeat steps d), e) and f);
   g) initiating payment for at least the customizable memorial product; and
   h) shipping at least the customizable memorial product to the user.

2. The method of claim 1, wherein said computer manages a web site dedicated to pet memorial products.

3. The method of claim 1, wherein said computer manages a web site dedicated to human memorial products.

4. The method of claim 1, wherein said type of services comprises the following: engraving, etching, photographic duplication, writing, calligraphy, handwriting, typing, laser marking, or printing.

5. The method of claim 1, wherein said customizable memorial product is a figurine.

6. The method of claim 5, wherein said figurine is classified by breed, size, color, type, position, state, kind, species, sub-species, gender, type of paint and material.

7. The method of claim 1, wherein said customizable memorial product is an urn.

8. The method of claim 1, wherein said customizable memorial product is a casket.

9. The method of claim 1, wherein said customizable memorial product is a cremation box or container.

10. The method of claim 9, wherein said cremation box or container comprises a sliding bottom tray, said tray having a screen to allow for scattering of ashes.

11. The method of claim 9, wherein said cremation box or container has a temperature-controlled unit.

12. The method of claim 9, wherein said cremation box or container may have a combination of one or more cap, lid, cover, drawers or tray.

13. The method of claim 1, wherein said customizable memorial product comprises at least one of a photo album, frame, digital display, analog display, video display, still-image display, or some predetermined default display.

14. The method of claim 1, wherein said customizable memorial product comprises at least one of a toy, memorabilia, gift, award, jewelry or prize.

15. The method of claim 1, wherein said customizable memorial product comprises a globe.

16. The method of claim 15, wherein said globe is a water globe, a gas-filled globe, snow flake globe, sports theme globe, stadium globe or shaped globe.

17. The method of claim 1, wherein said customizable memorial product is made of one or more of the following: plastic, wood, stone, artificial material, processed material, natural material, painted material, pressure-treated material, polished material, sandblasted material, soft material, cotton, clothing fabric, rug, carpet, or elastic material.

18. A system for customizing memorial products, said system comprising:
   a computer;
   a database operably connected to said computer;
   a user interface operably connected to said computer;

one or more customization software tools, executed by said computer
wherein said computer is configured to:
a) display to a user by said computer, selection choices from a group comprising: customizable occasion cards, customizable memorial products and standard products;
b) in response to receiving a selection choice from the user, determine by said computer customizable memorial products for display to the user, said determination based upon options comprising:
   access to a search engine;
   a menu of products;
   user's past purchase history profile;
   a suggestion; and
   an advertisement for related products;
c) receive a customizable memorial product selection from the user and type of services;
d) receive the user's selection of a customizing option associated with the selected customizable memorial product, wherein said customizing option attributes comprise at least one of: text, video, multimedia content, images, shape, color, material and size;
e) display to the user a real-time simulation of the customizing option applied to the customizable memorial product;
f) receive confirmation from the user the customized memorial product is complete else repeat steps d), e) and f);
g) initiate payment for at least the customizable memorial product; and
h) ship at least the customizable memorial product to the user.

19. The system of claim 18, wherein said type of services comprises the following: engraving, etching, photographic duplication, writing, calligraphy, handwriting, typing, laser marking, or printing.

20. The system of claim 18, wherein said customizable memorial product is made of one or more of the following: plastic, wood, stone, artificial material, processed material, natural material, painted material, pressure-treated material, polished material, sandblasted material, soft material, cotton, clothing fabric, rug, carpet, or elastic material.

* * * * *